(12) United States Patent
Giletta

(10) Patent No.: US 12,416,125 B2
(45) Date of Patent: Sep. 16, 2025

(54) METHOD AND SYSTEM FOR ADAPTIVE CONTROL OF AN INDUSTRIAL VEHICLE DURING A ROAD SURFACE TREATMENT OPERATION

(71) Applicant: GILETTA S.P.A., Revello (IT)

(72) Inventor: Enzo Giletta, Revello (IT)

(73) Assignee: GILETTA S.P.A., Revello (IT)

( * ) Notice: Subject to any disclaimer, the term of this patent is extended or adjusted under 35 U.S.C. 154(b) by 890 days.

(21) Appl. No.: 17/634,893

(22) PCT Filed: Aug. 20, 2020

(86) PCT No.: PCT/IB2020/057827
§ 371 (c)(1),
(2) Date: Feb. 11, 2022

(87) PCT Pub. No.: WO2021/033158
PCT Pub. Date: Feb. 25, 2021

(65) Prior Publication Data
US 2022/0325487 A1 Oct. 13, 2022

(30) Foreign Application Priority Data
Aug. 20, 2019 (IT) .................. 102019000014874

(51) Int. Cl.
*E01H 10/00* (2006.01)
*E01H 5/06* (2006.01)
(Continued)

(52) U.S. Cl.
CPC ............. *E01H 10/007* (2013.01); *E01H 5/06* (2013.01); *G05D 1/0219* (2013.01);
(Continued)

(58) Field of Classification Search
CPC ......... E01H 10/007; E01H 5/06; E01H 5/065; G05D 1/0219; G05D 1/0238; G05D 1/0257; G05D 1/0278
See application file for complete search history.

(56) References Cited

U.S. PATENT DOCUMENTS 3,821,997 A * 7/1974 Sieren ................ H01M 50/264
180/68.5
3,891,979 A * 6/1975 Braun ..................... G01W 1/14
340/602
(Continued)

FOREIGN PATENT DOCUMENTS

DE 3427367 2/1986
DE 3427367 A1 2/1986
(Continued)

OTHER PUBLICATIONS

International Search Report and Written Opinion of the International Searching Authority, dated Dec. 21, 2020, in connection with International Application No. PCT/IB2020/057827 (13 pages).

*Primary Examiner* — Mussa A Shaawat
(74) *Attorney, Agent, or Firm* — Klintworth & Rozenblat LLP

(57) ABSTRACT

A method for controlling an industrial vehicle comprising the steps of: detecting a physical feature that determines a local narrowing or a widening of said road route; calculating treatment parameters of the road surface adapted to be used in the presence of said physical feature; calculating an estimated time for reaching said physical feature; calculating a time interval value required for a complete implementation of the second treatment parameters; and starting the implementation of the second treatment parameters at a time that is equal to the estimated time excluding the time interval of complete implementation.

20 Claims, 6 Drawing Sheets

(51) Int. Cl.
  *G05D 1/00* (2006.01)
  *G05D 1/02* (2020.01)
(52) U.S. Cl.
  CPC ......... *G05D 1/0238* (2013.01); *G05D 1/0257* (2013.01); *G05D 1/0278* (2013.01); *E01H 5/065* (2013.01)

(56) References Cited

U.S. PATENT DOCUMENTS

| | | | | |
|---|---|---|---|---|
| 4,274,091 | A | * | 6/1981 | Decker ................... G01W 1/17 |
| | | | | 250/341.7 |
| 4,805,653 | A | * | 2/1989 | Krajicek ............... B08B 9/0433 |
| | | | | 239/165 |
| 5,799,835 | A | * | 9/1998 | Gobbel ................. B05B 15/656 |
| | | | | 239/281 |
| 5,904,296 | A | * | 5/1999 | Doherty ............... E01C 19/004 |
| | | | | 239/69 |
| 5,947,391 | A | * | 9/1999 | Beck ................... A01C 15/008 |
| | | | | 239/677 |
| 5,957,621 | A | * | 9/1999 | Clark, Jr. ............. E01C 19/174 |
| | | | | 404/101 |
| 6,085,993 | A | * | 7/2000 | Beggs ................. A01M 7/0071 |
| | | | | 239/166 |
| 6,173,904 | B1 | * | 1/2001 | Doherty ............... E01H 10/007 |
| | | | | 239/69 |
| 6,236,907 | B1 | * | 5/2001 | Hauwiller ............ A01B 79/005 |
| | | | | 701/50 |
| 6,246,938 | B1 | * | 6/2001 | Giletta ................. E01C 19/004 |
| | | | | 701/50 |
| 6,377,881 | B1 | * | 4/2002 | Mullins ................ A01D 41/127 |
| | | | | 701/470 |
| 6,491,234 | B2 | * | 12/2002 | Beggs ................. A01M 7/0075 |
| | | | | 239/166 |
| 6,535,141 | B1 | * | 3/2003 | Doherty ............... E01H 10/007 |
| | | | | 340/580 |
| 7,839,301 | B2 | * | 11/2010 | Doherty ............... E01H 10/007 |
| | | | | 239/662 |
| 9,284,703 | B2 | * | 3/2016 | Giletta ................... B60L 53/80 |
| 9,518,376 | B1 | * | 12/2016 | Shirchenko ............. E02F 9/22 |
| 10,113,283 | B1 | * | 10/2018 | Jones ..................... E01H 5/066 |
| 2005/0121546 | A1 | * | 6/2005 | Musso ................. E01C 19/203 |
| | | | | 239/672 |
| 2007/0089325 | A1 | | 4/2007 | Watson |
| 2012/0124868 | A1 | * | 5/2012 | Gendreau ............. E01H 5/066 |
| | | | | 37/266 |
| 2012/0246977 | A1 | * | 10/2012 | Proeber .................. E02F 9/262 |
| | | | | 37/197 |
| 2017/0328021 | A1 | * | 11/2017 | Miller ..................... E02F 9/264 |
| 2019/0150357 | A1 | * | 5/2019 | Wu ........................ H04N 7/188 |
| 2020/0047343 | A1 | * | 2/2020 | Bal ...................... B25J 9/1689 |
| 2020/0257997 | A1 | * | 8/2020 | Mewes ................. A01G 22/00 |
| 2023/0110849 | A1 | * | 4/2023 | Shankar ................ G06Q 10/04 |
| | | | | 703/2 |

FOREIGN PATENT DOCUMENTS

| | | |
|---|---|---|
| DE | 3812833 | 10/1989 |
| DE | 3812833 A1 | 10/1989 |
| RU | 2636402 C2 | 11/2017 |

\* cited by examiner

METHOD AND SYSTEM FOR ADAPTIVE CONTROL OF AN INDUSTRIAL VEHICLE DURING A ROAD SURFACE TREATMENT OPERATION

CROSS-REFERENCE TO RELATED APPLICATIONS

This patent application claims priority from Italian patent application no. 102019000014874 filed on Aug. 20, 2019, the entire disclosure of which is incorporated herein by reference.

TECHNICAL FIELD

This invention relates to a method and system for controlling an industrial vehicle during a road surface treatment operation.

BACKGROUND ART

There are known industrial vehicles adapted to spread on the road surface antifreeze products (such as chlorides, salt grains, salt solutions, or fluxes in general) to prevent or reduce the formation of ice and the deposit of snow on the road surface itself; and/or to spread abrasive products, such as sand or gravel, adapted to be incorporated into the layer of ice possibly covering the road surface to improve its grip features.

There are also well-known industrial snow plough vehicles adapted to mechanically remove snow and/or ice from the road surface to improve safety for road users. Vehicles of this type include a snow plough blade, driven by a handling unit. The blade comprises a rolling body, a removal knife (or scraper knife) permanently attached to a lower portion of the rolling body and protruding downwards to remove at least some of the snow/ice on the road surface. There are well known telescopic blades, configured to vary the lateral extension thereof, orthogonally to the forward direction of the industrial vehicle. The telescopic blades can be operated by the operator of the snow plough vehicle, who varies the lateral extension thereof in order to avoid or move beyond obstacles, or parked cars, along the route.

The same vehicle may have both the functionalities of spreading antifreeze products and snowploughing at the same time.

In particular, in vehicles of the types mentioned above, the spreading and snow plough operations are managed by electronic control devices adapted to control product-spreading parameters (e.g. the quantity of product spread per square metre, the width and symmetry of spreading, etc.) and/or blade parameters (e.g. lateral extension, height from the ground, float, descent, etc.) in a predetermined manner.

User interface means are provided inside the vehicle, for selecting the most suitable parameters for the route taken by the vehicle itself.

As far as spreading vehicles are concerned, there are well known methods in which, once a product-spreading program, which is suitable for the weather and morphological conditions of the chosen route, has been selected, the corresponding parameters are implemented irrespective of variations in the morphological, environmental, and traffic conditions of the route. Therefore, if these conditions change, the spreading parameters are no longer optimal and must be manually altered by the vehicle control operator, who must assess the specific situation and adjust the spreading parameters accordingly.

For example, changes in route conditions may occur when the vehicle encounters an obstacle on the roadway, or a parked car, or other vehicle.

Under these conditions, the operator in charge of controlling the industrial vehicle should reduce or modify the lateral spreading width of the antifreeze products in order to prevent damage to the parked car.

Similarly, the operator should modify the parameters of the blade, in particular its lateral extension and working angle, in order to avoid contact with the car that is parked or coming from the opposite travel direction.

The assessment of the vehicle operator in such critical situations may, in some cases, be incorrect. In other case, the operator may not realise the actual possibility of damaging a car parked on the roadside. Other unexpected situations may occur.

There is, therefore, a need to have vehicles equipped with devices for automatically checking the road conditions on which they operate, in order to intervene automatically on the road treatment parameters whenever the conditions of the route where the treatment occurs change, including to avoid errors caused by difficult operating conditions and/or operator's errors.

DISCLOSURE OF INVENTION

The purpose of this invention is to provide a method for controlling an industrial vehicle during a road surface treatment operation, and a system for controlling an industrial vehicle, which makes it possible to overcome, at least partially, the drawbacks of the prior art.

According to this invention, a method for controlling an industrial vehicle, and a system for controlling an industrial vehicle, as defined in the attached claims, are provided.

BRIEF DESCRIPTION OF THE DRAWINGS

In order to better understand this invention, a preferred embodiment thereof will now be described by way of non-limiting example with reference to the accompanying drawings, in which.

BEST MODE FOR CARRYING OUT THE INVENTION

Figure 1:
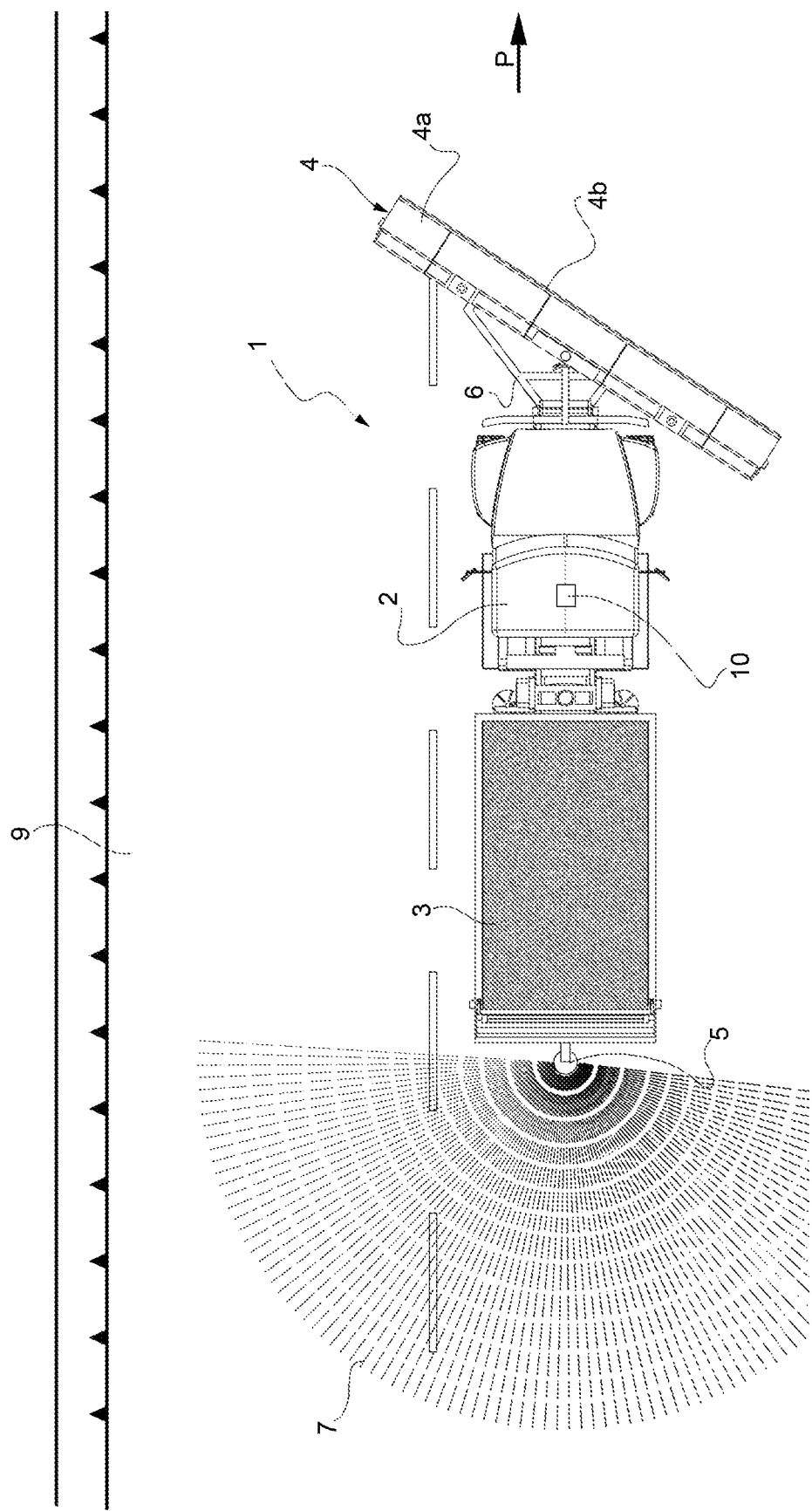
FIG. 1 schematically illustrates a vehicle for spreading products on the road surface and removing snow/ice.

FIG. 1 shows a vehicle, indicated, as a whole, with the number 1, in particular an industrial vehicle, equipped with a tractor 2, a tank 3 for housing one or more products (solid or liquid) for treating a road surface 9, and delivery means 5, fitted, for example, to the rear of the vehicle 1, and adapted to spread the product 7 on the road surface 9 of a road route P along which the vehicle 1 is moving. In particular, in the embodiment shown, the vehicle 1 is adapted to deliver antifreeze products (e.g., melting or abrasive chlorides, both liquid and solid).

The delivery means 5 is automatically controllable to perform one or more of the following operations:

solid-product dosing (NaCl, CaCl, MnCl, abrasives, etc.),
liquid product-dosing (NaCl, CaCl, MnCl, specific chemicals, etc.).

The spreading mode can be defined by one or more spreading parameters, including:

quantity of fluxes or abrasives or liquid product delivered per square metre;
spreading width;
symmetry of spreading (lateral or central in relation to the vehicle axle).
percentage humidification of the spread material.

The product 7 to be spread is chosen as necessary depending on the environmental conditions in which the vehicle 1 operates. For example, the product 7 is chosen among: granular abrasive products (such as gravel or sand), liquid antifreeze products (e.g. salt solutions or flux solutions in general) adapted to hinder (or reduce) the formation of ice and/or the deposit of snow on the road surface.

The vehicle 1 also comprises a snow plough blade 4 equipped with a support arm and attachment of the blade 4 to the tractor 2 and a blade handling unit 6, which is itself known and partially illustrated. The blade 4 comprises, in a known way, a rolling body 4a, a removal knife, or scraper knife, 4b permanently attached to a lower portion of the rolling body 4a and protruding downwards to remove at least some of the snow on the road surface 9. The knife 4b is made of metal or polymer material.

The handling unit 6 is automatically controllable to perform one or more of the following operations:

raise and lower the blade 4 in relation to the road surface 9;
rotate the blade 4 itself about at least one horizontal adjustment axis and/or about a vertical axis;
adjust the pressure on the ground of the scraper knife;
adjust the approach angle of the scraper knife (the more inclined it is the more aggressive it is);
adjust the roller and the upper protection (it must be very open in wet snow to allow its evacuation without additional effort, while it must be very closed in dry snow so that the powder snow can be controlled and is not dispersed across the windscreen).

The vehicle 1 is also equipped with an electronic control device or system 10 (only schematically illustrated) adapted to control the delivery means 5 in order to adjust, in a known way, the quantity of product delivered and the dispensing modes as a function of a number of spreading parameters. The electronic control system 10 is also adapted to control the snow plough blade 4, activating the handling unit 6 of the blade 4.

Figure 2:
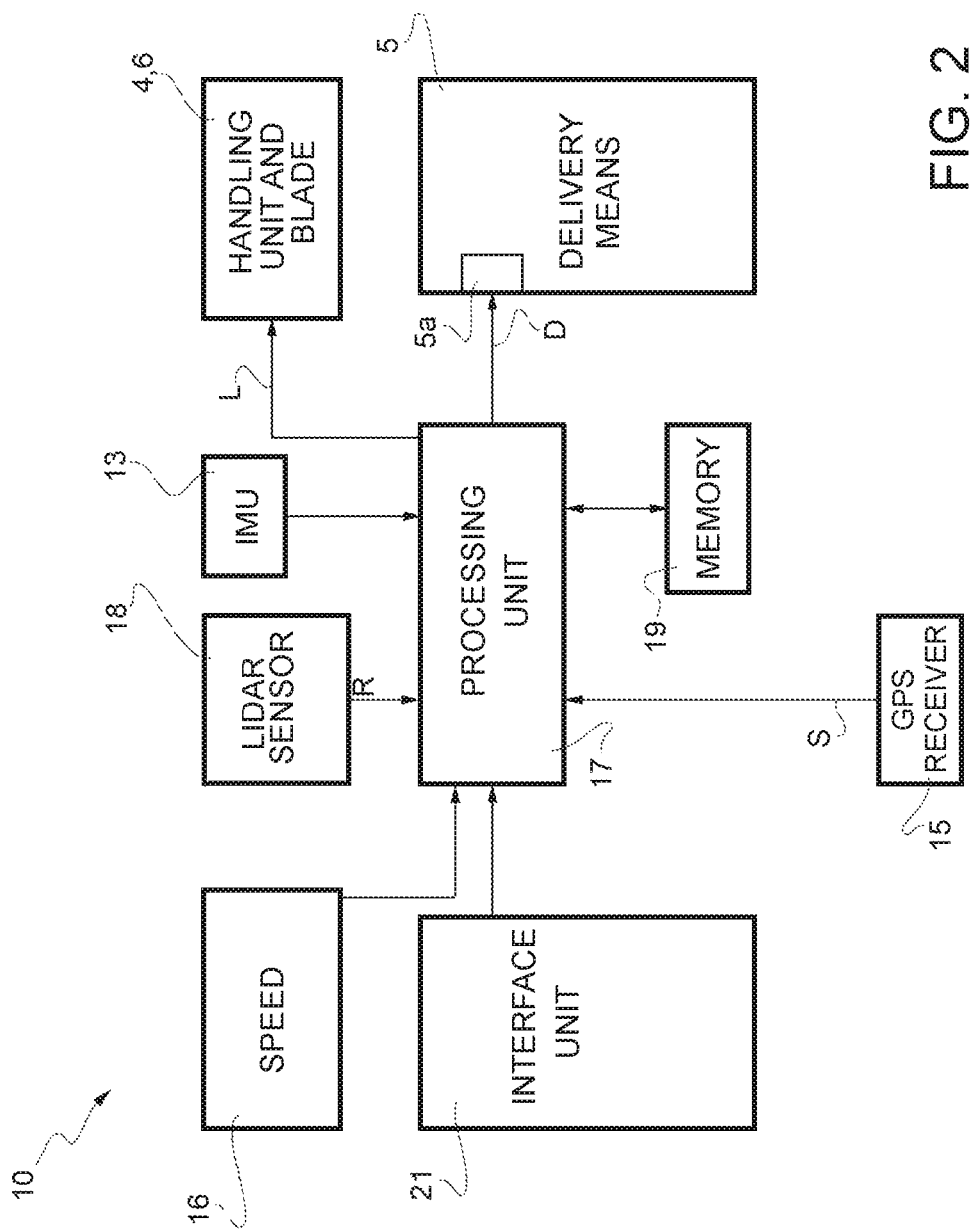
FIG. 2 is a block diagram of a control system for the product-spreading and snow/ice-removal operations of the vehicle in FIG. 1.

With reference to FIG. 2, the electronic control system 10 comprises: a GPS or GNSS receiver 15, the purpose of which is to generate, on output, a signal S correlated to the position and/or forward direction of the vehicle 1 (below, explicit reference will only be made to the GPS system without any loss of generality thereby); an inertial measurement unit (IMU) 13, the function of which is to detect accelerations (e.g. lane change) of the vehicle 1; a processing unit 17 working with the GPS receiver 15; a speed detector 16, to detect the speed of the vehicle 1; and a memory 19 communicating with the processing unit 17. The IMU and the speed detector 16 are optional, and the corresponding data can be acquired directly from the GPS/GNSS system, or using other systems.

The data acquired from the GPS/GNSS satellite-based location system 15, from the IMU unit 13, and from the speed detector 16 are sent and processed by the processing unit 17 to determine one or more of the following: the position, direction, instantaneous speed, angular speed, and angular acceleration of the vehicle 1. The position data are updated regularly, for example every 1 or few Hz.

The speed detector 16 is typically provided by vehicles 1 of a known type during the manufacturer's construction of them, and may include a speed transducer that transforms a mechanical quantity into an electric quantity (e.g. voltage pulses)—for example, a tachometer dynamo, or tachometer encoder, which transduces the number of turns of a rotating body (e.g. the wheels) into a voltage (or into voltage pulses).

The handling unit 6 is controllable by the processing unit 17 as a function of one or more of the above-mentioned operating parameters.

The electronic control system 10 optionally comprises an interface unit 21 communicating with the processing unit 17 and adapted to be used by an operator (not shown) in the passenger compartment of the vehicle 1 for monitoring and controlling salt-spreading and snow-removal operations and/or for detecting any abnormalities or alarms. The interface unit 21 can also be integrated with the processing unit 17.

The processing unit 17 is adapted to send control signals D to an interface 5a of the delivery means 5 to control the quantity of salt dispensed and the spreading methods. For example, by means of the control signals D, the quantity of salt delivered per square meter, the width of spreading, the symmetry of spreading (lateral, central), the percentage humidity of the salt that is spread, etc. can be adjusted (in a known way).

The processing unit 17 is also adapted to send control signals L towards the handling unit 6 of the blade 4 to control, in a known way, blade 4 operating parameters (width of the telescopic blade, orientation of the blade in relation to the route P, pressure on the ground of the blade, approach angle, working angle in relation to the road axis, etc.).

The electronic control system 10 also comprises a remote sensor 18 (for example, a LIDAR, a RADAR, etc.), operatively coupled to the processing unit 17, configured to perform a scan of the road route P in the travel direction of the vehicle 1 in order to detect different types of obstacles/elements present on the road route P (e.g. obstacles on the roadway, parked vehicles, barriers, footpaths, etc.), and to generate a signal R that contains data relating to the obstacles/elements detected by the sensor 18.

The signal R is provided to the processing unit 17 (and may be saved in the memory 19), for additional processing, in order to obtain information relating to the route P. Such information includes, but is not limited to, one or more of the following:

the width of the road and/or of the roadway or lane of the vehicle 1 at a constant distance (known as "electronic horizon");
the distance of the vehicle 1 from the left lateral edge of the roadway or of the road, in relation to the travel direction of the vehicle 1;

the distance of the vehicle 1 from the right lateral edge of the roadway or of the road, in relation to the travel direction of the vehicle 1;

the distance between the vehicle 1 and an obstacle/element that is detected;

the distance between the vehicle 1 and another vehicle that is travelling in the opposite lane.

This set of information defines the specific environmental conditions of the road route P on which the vehicle 1 is located while operating.

The spreading and operating parameters of the blade 4, relating to the route P carried out by the vehicle 1, are automatically set as a function of the above-mentioned information obtained by processing the signal R provided by the sensor 18. The set of all possible spreading and operating parameters of the blade 4 is stored in a database in the memory 19 (or in another memory—not illustrated—adapted for this purpose and communicating with the processing unit 17).

The set of spreading and operating parameters of the blade 4 defines the salt-spreading/snow-removal methods adapted to the respective morphological conditions of the route and/or the presence of obstacles or other elements as discussed above.

The data representing these spreading/snow-removal methods are contained in the memory 19, which communicates with the processing unit 17 to generate the control signal D of the delivery means 5.

According to this invention, the different spreading methods are automatically selected based on the specific conditions of the road route P on which the vehicle 1 is located while operating. Similarly, the different methods for adjusting the handling unit 6 of the blade 4 are also automatically selected based on the specific conditions of the road route P on which the vehicle 1 is located while operating.

These conditions include (but are not limited to): one or more obstacles present on the road route P; presence of cars or other types of vehicles on the road route P, for example those parked on one side of the roadway; presence of cars, or other types of vehicles, on the road route P and coming towards the vehicle 1 on the opposite roadway; presence of barriers on the route P; presence of footpaths on the side of the roadway.

The memory 19 also stores an environmental model that, based on data collected by the sensor 18, provides, in real time, the width of the road and/or of one or both of the roadways at a constant distance called the "electronic horizon" (eH).

The term electronic horizon refers to the distance (which can be configured) within which the detection system (LiDAR) is able to provide reliable data (that represent roads, intersections, road attributes, road objects, and road geometries, etc.). As this distance increases, the resolution and, thus, the accuracy decreases. It is, in other words, the distance to which the sensor is able to acquire data affected by a minor error, or considered minor in terms of the specific application. Typically, the electronic horizon is less than 250 metres.

In addition, the environmental model provides the distance of the vehicle 1 from the left lateral edge (distance d1) and from the right lateral edge (distance d2) of the roadway or of the road, and the total width of the road $d_{TOT}$. The environmental model is able to identify different types of obstacles: parked vehicles, barriers, footpaths, etc., in various weather conditions.

Environmental models adapted for this purpose are known in the state of the art and do not constitute, in themselves, the object of this invention. In particular, numerous models and algorithms are known for extracting the edge of a road ("road-edge extraction"), which can be used in the context of this invention.

Consider, for example, U.S. Pat. No. 6,405,128 for more information relating to known environmental models that can be used in the context of this invention.

See also Kaijin Qiu et al., "A Fast And Robust Algorithm For Road Edges Extraction From Lidar Data", The International Archives of the Photogrammetry, Remote Sensing and Spatial Information Sciences, Volume XLI-B5, 2016 XXIII ISPRS Congress, 12-19 Jul. 2016, Prague, Czech Republic.

Environmental models, implemented using computer programs, and adapted to provide the above-mentioned information, are, however, commercially available.

It should be noted that, in a different embodiment, the distance of the vehicle 1 from the left lateral edge (d1) and from the right lateral edge (d2) of the road or roadway can be acquired even in the absence of software that implements the above-mentioned environmental model, for example using proximity or position sensors or LiDAR or RADAR of a known type (e.g. already used in transport means, for example parking sensors).

Figure 3:
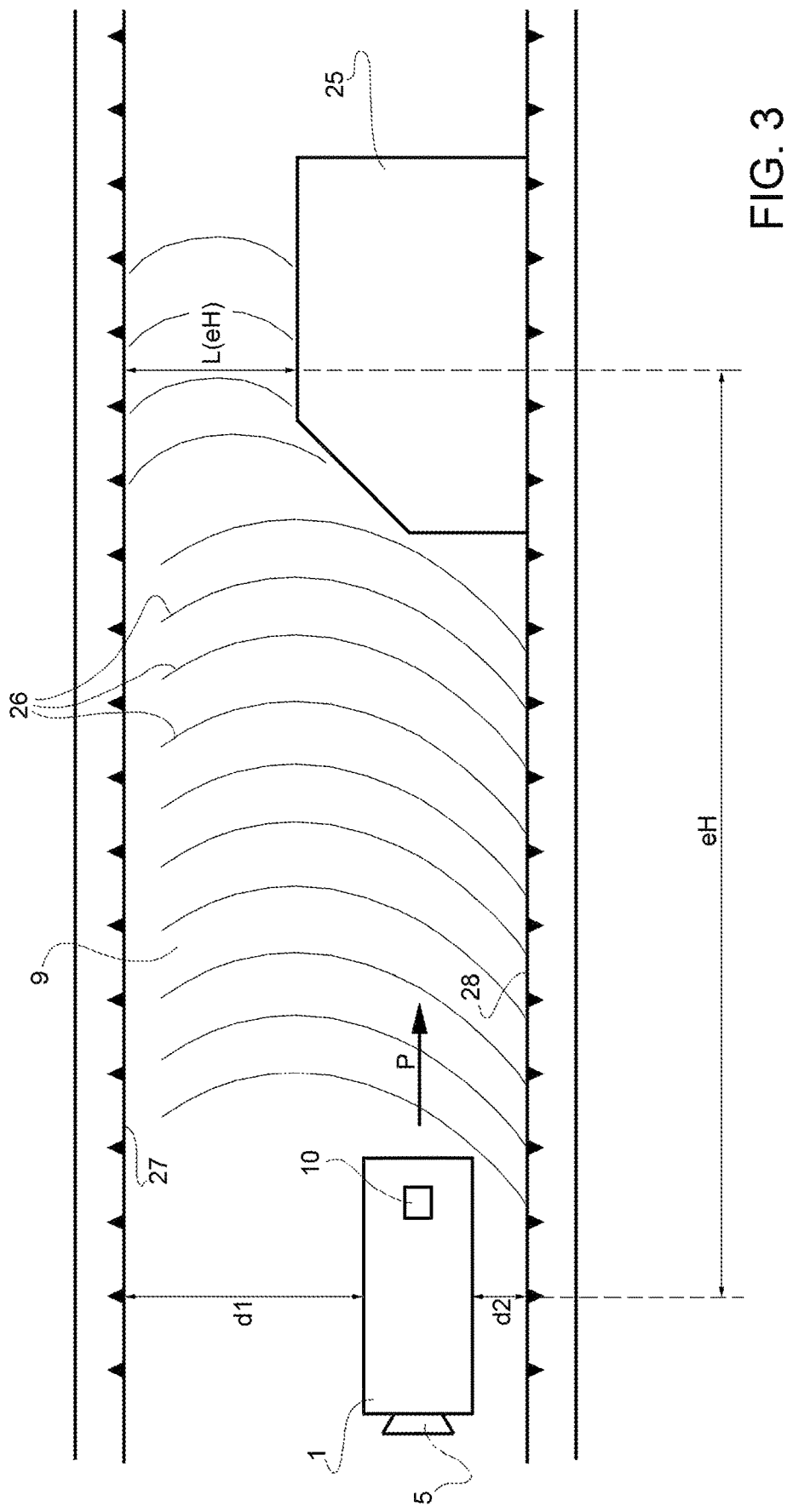
FIG. 3 is a schematic representation of the vehicle in FIG. 1 approaching an obstacle.

FIG. 3 graphically illustrates the above-mentioned parameters (eH, d1, d2) as a function of data collected by the remote sensor 18. FIG. 1 schematically illustrates the industrial vehicle 1 approaching an obstacle 25 present on the roadway. The left lateral edge 27 of the road route (or of the roadway) and the right lateral edge 28 of the road route (or of the roadway) are, for example, defined by a corresponding guardrail or the like (e.g. change in state of land such as, for example, asphalt-grass, or the horizontal roadway boundary marking). The remote sensor 18 emits a signal 26 in the travel direction of the vehicle 1 and acquires an echo signal (not illustrated) for the calculation of the minimum width L(eH) to the distance defined by the electronic horizon eH. In FIG. 3, the width L(eH), in the presence of the obstacle 25, is the distance between the obstacle 25 and the left lateral edge 27 of the road route, which corresponds to the width (orthogonal to the travel direction P) of the portion of road that the vehicle 1 will have to travel to overtake the obstacle 25.

Figure 4:
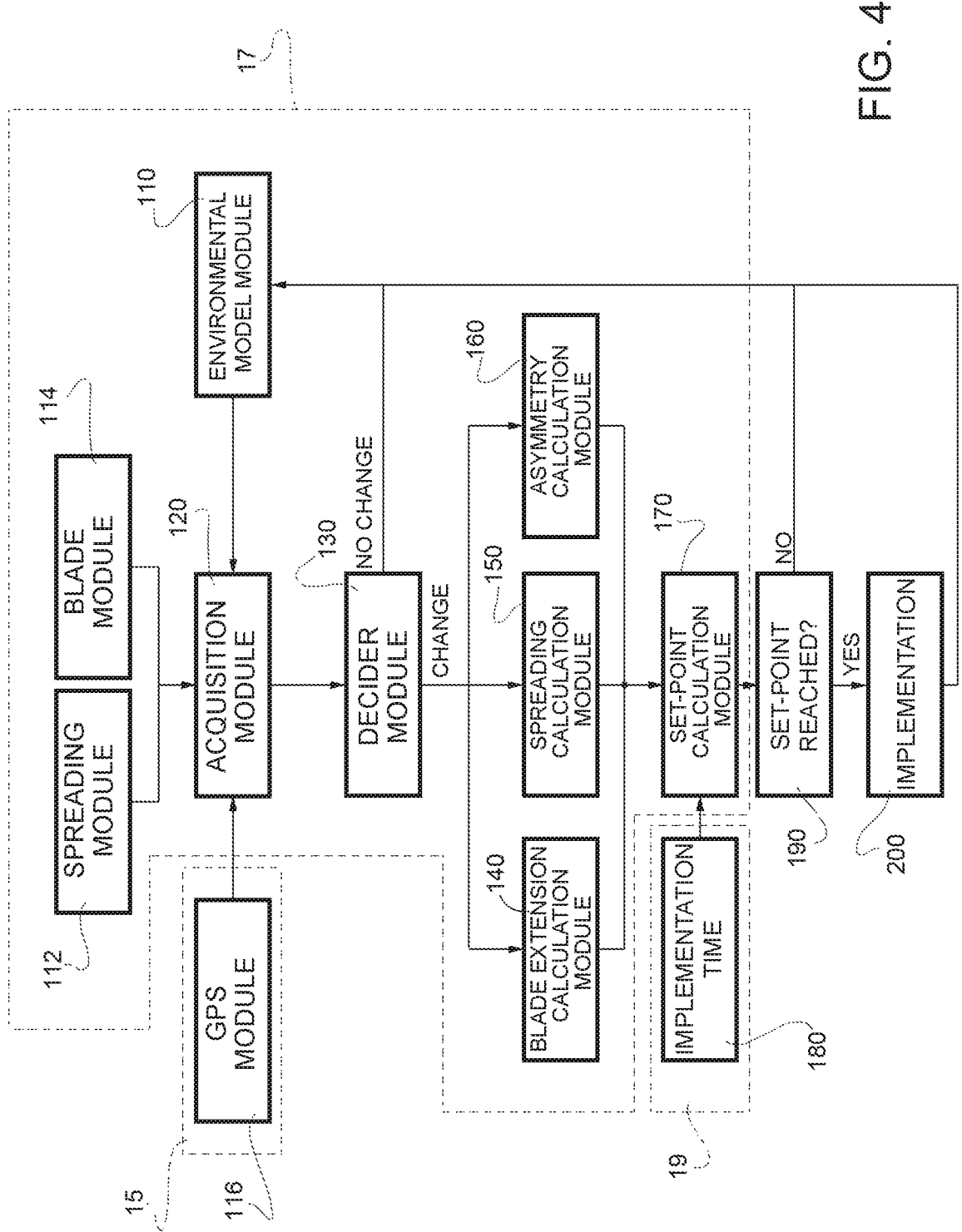
FIG. 4 is a block diagram of functional modules implemented by the control system in FIG. 2.

The processing unit 17 also implements (via the execution of software instructions stored in the memory 19) the automatic selection functionalities for the spreading methods based on the specific conditions of the road route P on which the vehicle 1 is located while operating. FIG. 4 schematically illustrates these functionalities divided into functional modules.

In particular, the processing unit 17 implements the functions of an acquisition module 120 of inlet parameters, configured to acquire: the data generated by the environmental model (environmental model module 110 in FIG. 4), predefined spreading parameters (spreading module 112 in FIG. 4), predefined operating parameters for the blade 4 (blade module 114 in FIG. 4), and the position data generated by the GPS receiver 15, speed data generated by the tachometer signal, and acceleration signal detected by the inertial sensors (GPS module 116 in FIG. 4 and IMU unit 13).

In particular, according to one embodiment, the acquisition module 120 receives the values eH, d1, d2, L(eH) from the environmental model module 110; the dosage and humidity percentage values of the product to be spread from the spreading module 112; the extension, height, float, descent under pressure, deflector of the blade 4 values from the blade module 114; the indication of the position from the GPS module 116; and the vehicle 1 speed from the tachometer.

The acquisition module 120 receives as input the above-mentioned data and implements the data normalisation function (including the operations for eliminating/filtering incoherent data with the detected sequence, e.g. due to a GPS datum with an error above a certain threshold or absent, or because the tachometer signal is lost etc.). In addition, the acquisition module 120, after having performed the data normalisation functions, implements the data historization functions (e.g. by means of storing in a memory buffer the normalised datum to be used for successive processing: e.g., the latest "N" GPS positions considered correct or normalised are saved, with "N" chosen freely as a function of the available memory).

The data are written in an area of the memory 19 and made available to additional functional modules.

By way of example, the acquisition module 120 receives the following data as input:

ID_POINT: is formed from a code (e.g., alphanumeric incremental) that identifies the data acquired at a certain time in a certain geographical position, in order to maintain the historicity of the data;

LATITUDE, LONGITUDE: geographical coordinates (e.g. in degrees measured by the GPS receiver 15) of the point where the data acquisition occurred;

NUM_PULSES: number of tachometer pulses generated beginning from the last acquisition (corresponding to the immediately preceding "ID_POINT")—the number of pulses counted in the unit of time is proportional to the speed detected during the movement of the vehicle 1; and ANGLE: direction of the vehicle 1 (angle between the direction of the vehicle 1, defined by the speed vector, and the direction of true north at the detection point).

The input parameters can be loaded, for example, in a tabular (matrix) structure, where each line identifies an "ID_POINT", and each column relates to the value of the other parameters (LATITUDE, LONGITUDE, NUM_PULSES, ANGLE) for each "ID_POINT", so as to be easily used in successive processing.

The processing unit 17 implements the additional functions of a decider module 130, configured to receive as input data generated by the acquisition module 120.

In the decider module 130, the normalised datum received as input by the acquisition module 120 is compared with historical data present in the memory 19. If this operation confirms that there are no differences between the data previously provided by the environmental model module 110 and the current data (L(eH), d1, d2), the acquisition module 120 acquires new data from the environmental model module 110, which generates an updated datum. This situation corresponds to the case where the vehicle 1 is still, or proceeds along a route that is free of obstacles.

If a change in one of the observed values (change in L(eH), d1, d2—due to a narrowing of the roadway or road due to an obstacle, including parked cars, barriers, cars coming in the opposite direction, or a driver manoeuvre such as a lane change) is detected, the decider module 130 activates the recalculation functions of the spreading and blade parameters.

The decider module 130 works on the latest datum registered (in temporal order) by the acquisition module 120 in the tabular structure mentioned above, and compares the value of the parameters L(eH), d1 and d2 with the corresponding values at the corresponding point at the immediately preceding time. If at least one of these parameters changes, the position of the geographical point (target point) at which to change the spreading/extension parameters of the blade 4 should be calculated. Two scenarios may occur:

Scenario 1) of change in distance d1/d2 from the left/right edge, i.e. the vehicle 1 has made a manoeuvre such as a lane change. In this case, the decider module 130 observes the changed parameter for a time $t_s$ (which can be configured) and waits for the new condition to stabilise. When the new value is constant in the temporal observation window $t_s$, one immediately move on to calculating the new spreading parameters (module 140) and the extension and/or orientation of the blade (module 150), to immediately implement these.

Figure 5:
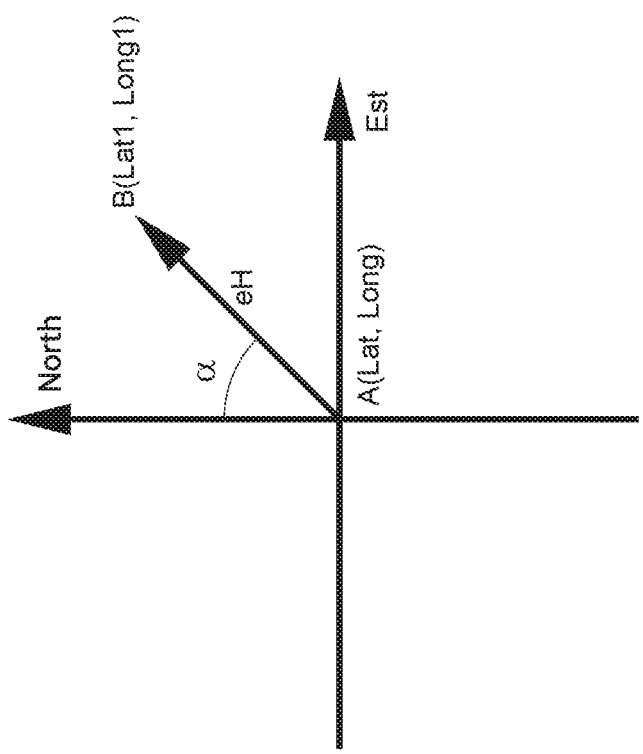
FIG. 5 is a Cartesian axis representation illustrating a method of calculating the geographical coordinates of the obstacle in FIG. 3 from known coordinates of the vehicle's geographical position and from a forward direction of the vehicle.

Scenario 2) of change in width of spreading, i.e. an obstacle was detected that leads to a reduction in the width of the road, or the road widens because it moves from two to three lanes. In this case, making reference to FIG. 5, having the coordinates of the starting point A available, or the current vehicle position, the above-mentioned ANGLE datum ($\alpha$ in FIG. 5), and the distance (eH), it is possible to calculate the coordinates of the point B where the obstacle was detected with trigonometric formulae: Lat1=eH–sin($\alpha$), Long1=eH–cos($\alpha$).

Then one move on to calculating new spreading and extension parameters for the blade, which will be implemented at point B (or before this point, taking into account the activation latencies).

With reference to FIG. 4, the decider module 130 is configured to implement modules 140, 150, and 160 as a function of the result of the decision.

The module 140 is configured to calculate the extension and, optionally, the orientation of the telescopic blade 4 based on the width L(eH) detected at the electronic horizon distance eH, and at the detected position of the vehicle 1 in relation to the left and right edge 27, 28 of the roadway, or road, travelled by the vehicle 1. The calculation of the blade 4 extension is performed in such a way that the lateral extension and, optionally, the orientation of the blade 4 is reduced or modulated by a value sufficient to enable the transit of the vehicle 1 laterally to the obstacle (i.e. between the obstacle 25 and the left edge 27 in FIG. 3) without damaging the obstacle and the blade 4, in particular due to an unwanted impact between the blade 4 and the obstacle.

The above also applies in the case where the industrial vehicle 1 performs a direction change manoeuvre in the absence of an obstacle. The direction change causes, in fact, a change in the distance of the industrial vehicle 1 from the left and right edge of the road and requires a corresponding change in the lateral extension of the blade 4, or a change in the orientation of the blade. In fact, the blade 4 may only need to be reduced in its extension near one edge of the road (the one nearest the industrial vehicle 1).

Similarly, the spreading of the product on the road surface is configured in such a way that the lateral spreading does not impact the obstacle 25 or the left edge 27 of the road.

For example, if L(eH) is the width between the obstacle 25 and the left margin 27, the blade extension is reduced below L(eH), and the delivery means 5 are controlled so that the left and right lateral ranges are less than L(eH)/2.

The module 150 is configured to calculate the solid/liquid-product spreading width based on the width L(eH) detected at the electronic horizon eH, and at the relative position of the vehicle 1 in relation to the left and right edge 27, 28 of the roadway, or road, travelled by the vehicle 1. The calculation of the spreading width is performed in this way so that the spreading width is reduced or modulated by a value sufficient to enable the transit of the vehicle 1 laterally to the obstacle (i.e. between the obstacle 25 and the left edge 27 in FIG. 3) without damaging or dirtying the obstacle, in particular due to unwanted impact between the product spread and the obstacle. In this way, spread product waste is avoided since it isn't dispersed where it is not needed.

The module 160 is configured to calculate the spreading asymmetry based on the width L(eH) detected at the electronic horizon eH, and at the relative position of the vehicle 1 in relation to the left and right edge 27, 28 of the roadway, or road, travelled by the vehicle 1. The spreading asymmetry takes into consideration the fact that, in the presence of an obstacle exclusively on one side of the vehicle 1 (e.g. on the right side as in FIG. 3), the spreading width can be exclusively reduced on the right side, while it can be kept unchanged (or reduced by a lesser quantity) on the left side.

This also applies in the case where the industrial vehicle 1 performs a direction change manoeuvre in the absence of an obstacle. The direction change causes, in fact, a change in the distance of the industrial vehicle 1 from the left and right edge of the road and requires a corresponding change in the range of the product 7. In fact, the product 7 may need to be spread in an asymmetrical manner to reach both the right edge and the left edge of the road, without surpassing one or the other. The spreading of the product 7 will only be symmetrical if the industrial vehicle 1 proceeds at the centre of the road, at an equal distance from the left and right edges.

With reference to the two scenarios described previously, the calculations performed by the modules 140-160 may differ.

For scenario 1) the value of the left asymmetry A1 will be given by the distance from the left margin A1=d1, while the value of the right asymmetry A2 will be given by the distance from the right margin A2=d2, and the implementation will be carried out instantly at the end of the observation window $t_s$ of the decider module 130.

For scenario 2) the current width value L(eH)' at the electronic horizon will be given by the last width detected by the sensor 18 at the electronic horizon eH: L(eH)'=L(eH) and the right asymmetry A2 and left A1 will be half the value of the width L(eH)' respectively: A1=A2=L(eH)'/2.

Again with reference to FIG. 4, the processing unit 17 implements the additional functions of a set-point calculation module 170, configured to calculate the time required to complete the mechanical implementation from the current geographical position to the new position (at the distance of the electronic horizon eH) based on the known latencies of the delivery means 5 and of the handling unit 6. The datum generated on output by this module is used to define the "set point" given by the maximum time between all the times calculated as a function of the speed and acceleration values of the vehicle 1. In this context, the "set-point" time is the time when the command to modify the spreading/blade-extension parameters is sent, so that, taking into account the latency of mechanical implementation and the speed of the vehicle 1 in relation to the obstacle, the operation is completed when the identified obstacle is reached.

The set-point calculation module 170 receives, on input, data from a block 180 identifying the maximum mechanical implementation times required by the vehicle 1 to change the blade 4 extension and the spreading parameters of the delivery means 5. In other words, the block 180 identifies the delays between sending the implementation command and the complete (mechanical) implementation of the delivery means 5 and the handling unit 6 of the blade 4. The block 180 data is, for example, saved in the memory 19.

The set-point calculation module 170 also receives on input the current speed value of the vehicle 1 and the distance to the obstacle.

On the basis of the information thus acquired, the set-point calculation module 170 is able to identify the timing of reaching a geographical "set-point", at which to start the implementation commands. The set-point is calculated as the point the distance of which from the obstacle is such that the spreader and the blade are fully implemented when the vehicle 1 reaches the obstacle. In other words, knowing the speed of the vehicle 1, the distance between the set-point and the obstacle is travelled by the vehicle 1 in a time equal to the time needed to completely implement the spreader and the blade, so that the latter operate on the basis of the new parameters when the obstacle is reached (not significantly before, and not significantly after).

Figure 6:
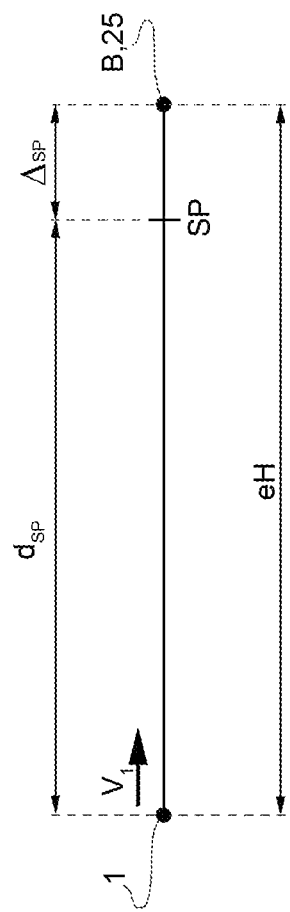
FIG. 6 is a schematic representation showing an estimated route between the vehicle and the obstacle in FIG. 3, with identification of a starting point for the implementation of the product-spreading and snow/ice-removal operations that takes into account mechanical implementation latencies.

With reference to FIG. 6, the case where the vehicle 1 is moving towards the obstacle (point B) at a speed $v_1$ (the relative speed of the vehicle 1 with respect to the obstacle) along a supposed straight path and in the direction of the vector speed $v_1$ is considered. The distance between the vehicle 1 and the obstacle 25 (point B) is given by eH (calculated by the environmental model module 110). The geographical set-point is identified on the line connecting the vehicle 1 to the obstacle B, and is identified with the reference SP in FIG. 6. The distance between the set-point SP and the obstacle 25 (point B) is indicated with $\Delta_{SP}$. This distance $\Delta_{SP}$ must be travelled by the vehicle 1 in a time equal to the maximum implementation time $t_{ATT\_MAX}$ of the spreader and blade and, in general, may take into account all implementation delays that depend on the vehicle 1 used. The value of $t_{ATT\_MAX}$ is therefore known.

For example, since the elongation/shortening time of the blade 4 per unit of space and time (e.g. meters per second) is known, it is possible to calculate an extension value $t_{ATT\_L}$ calculated by the module 140 as a function of L(eH). The same is true for the delivery means 5, which are controlled in such a way as to regulate at least one of the following: the type of product spread, the quantity of product spread per unit area, the spreading width, or the spreading symmetry. It should be noted that the corresponding adjustment requires a known time equal to $t_{ATT\_S}$. The set-point module 170 receives $t_{ATT\_L}$ and $t_{ATT\_S}$, and determines $t_{ATT\_MAX}$=max($t_{ATT\_L}$, $t_{ATT\_S}$).

A safety margin may be provided. The distance $\Delta_{SP}$ is therefore equal to $v_1 \cdot t_{ATT\_MAX}$. Consequently, the distance $d_{SP}$ between the vehicle 1 and the point SP is equal to eH$-\Delta_{SP}$, and is travelled by the vehicle 1 in a time equal to $v_1 \cdot d_{SP}$.

Generally speaking, the process implemented by the module 170, which leads to identifying the reaching (or "match") of a set-point SP, is as follows:

i. When the distance (eH) between the vehicle and the obstacle is known, an estimate of the number of tachometer pulses to reach the set-point SP is made, the GPS coordinates of the set-point SP are acquired. In fact, since the number of pulses per metre $N_I$ is a known parameter (depends on the configuration of the tachometer mounted on the vehicle 1), when the distance $d_{SP}$ separating the vehicle 1 from the obstacle is known, the estimated number $N_{SP}$ of pulses is $N_{SP}=d_{SP} \cdot N_I$.

ii. The number of actual tachometer pulses $N_E$ of the vehicle 1 during use is counted.

iii. When the number $N_E$ exceeds a threshold (variable, chosen as a percentage value in relation to the estimate $N_{SP}$, e.g. 80% of NSP) the current GPS coordinates of the vehicle 1 are also detected.

iv. The number of pulses $N_E$ and current GPS coordinates are compared with the corresponding reference/estimate values and when at least one of them reaches the reference/estimate value, the set-point SP is considered to have been reached.

It is clear that the procedure described above can be modified using only the evaluation of the number of tachometer pulses, so that the set-point SP is considered to be reached when $N_E=N_{SP}$. Similarly, the GPS signal can be used alone, so that the set-point SP is considered to be reached when the GPS coordinates of the set-point SP correspond (except for the error inherent to the GPS system) to the current GPS coordinates of the vehicle 1.

Tachometer Management

The decider module 130 initializes, as said, the tabular structure containing the implementation target points. Each target point is also associated (in addition to latitude, longitude, and direction) with the distance from the current position expressed as the number of tachometric pulses.

This information can be used as follows: if, once the number of tachometric pulses has been reached, the vehicle 1 is located at a distance below a tolerance threshold (which depends on the accuracy of the GPS signal), the spreading/blade-extension parameters are implemented.

With reference to FIG. 4, the module 190 relates to checking that the set-point SP has been reached, based on the above considerations. If the set-point SP has not been reached, then one return to the environmental model module 110, with the acquisition of updated values of eH, d1, d2, and repeat the steps described above for a new calculation of the distance $d_{SP}$. The reacquisition/recalculation cycle of the values eH, d1, d2 is performed at regular intervals, or continuously. In this way, even in the case of route changes, slowdowns, speed increases, etc. of the vehicle 1, the estimate of the time to reach the set-point SP is kept updated with actual and current conditions.

If the set-point SP is reached, then (block 200) the mechanical changes to the delivery means 5 and to the blade 4 are implemented via the handling unit 6, sending the corresponding implementation controls by the processing unit 17.

One then return to the environmental model module 110 steps, to acquire the values of $d_1$ and $d_2$ and eH in order to correctly operate the delivery means 5 and the blade 4 for the whole extension of the obstacle. In fact, a local variation in the width of the obstacle would cause a variation in the values of $d_1$ and $d_2$, resulting in a change in the operating conditions of the spreader and/or blade.

Similarly, checking the above-mentioned values makes it possible to identify the end of the obstacle, with consequent restoration of the implementation parameters prior to the obstacle (or, in any case, new parameters that take into account the change detected).

This invention therefore provides an adaptive control for the industrial vehicle 1, which is able to automatically adapt to various (unexpected) conditions of the road route and the driver's potential driving changes, implementing, as needed, the best strategies (blade movement and extension/spreading of the products) for the current situation.

Lastly, it is clear that modifications and variations may be made to what is described and illustrated herein without departing from the scope of the present invention.

In particular, this invention applies in a self-evident manner to vehicles 1 configured to perform even only one of the following operations: spreading solid/liquid products and mechanical snow/ice removal using the blade 4.

In addition, it should be noted that the obstacle 25 may be any element present on the roadway, or otherwise present on the route of the industrial vehicle 1, such as an additional vehicle (car, truck, bicycle, etc.) travelling in front of the industrial vehicle 1 in the same travel direction, or coming towards the industrial vehicle 1 in the opposite travel direction.

In addition, the interface unit 21 is a user interface that can be configured to show the driver the parameters (blade handling and extension/product spreading) that are set or expected to be set, as needed, following the detection of an obstacle or change of direction or other element on the route. The user interface can also show the driver warnings or alarms if the driver's driving style is such that new parameters (blade handling and extension/spreading products) cannot be fully implemented before reaching the obstacle (e.g. due to the speed of the vehicle 1 being so high that they cannot be fully implemented in time $t_{ATT\_MAX}$)

The invention claimed is:

1. A method for controlling an industrial vehicle during a road surface treatment operation of a road route carried out by the industrial vehicle using first treatment parameters, comprising the steps of:
    detecting at least one of: i) a physical feature in said road route, ii) an actual variation of the travel direction of the industrial vehicle in said road route, and iii) a planned variation of the travel direction of the industrial vehicle in said road route,
    wherein said physical feature determines a local narrowing or widening of said road route, and said actual variation and planned variation determine a corresponding variation of a first distance of the industrial vehicle from a first edge of the road route and of a second distance of the industrial vehicle from a second edge of the road route;
    calculating, as a function of said first and second distances, and/or as a function of said local narrowing or widening, second treatment parameters of the road surface; and
    in case of actual variation of said travel direction, controlling the immediate implementation of the second treatment parameters by the industrial vehicle;
    otherwise carrying out the steps of:
    calculating an estimated time for reaching said variation of the travel direction or physical feature,
    calculating a time interval value required for a complete implementation of the second treatment parameters, and
    starting the implementation, by the industrial vehicle, of the second treatment parameters at a time that is equal to the estimated time excluding the time interval of complete implementation.

2. The method according to claim 1, wherein said physical feature is one between: a geometric variation of the road route; a presence of an object or obstacle in said road route; a presence of transport means in said road route.

3. The method according to claim 1, wherein the industrial vehicle comprises delivery means configured to spread a solid and/or liquid product on the road surface,
    and wherein the implementation of the second treatment parameters comprises adjusting spreading parameters of said product between: type of product spread, amount of product spread per area unit, the width of spreading, symmetry of spreading.

4. The method according to claim 1, wherein the industrial vehicle is provided with a blade of telescopic type for the mechanical removal of snow and/or ice from the road surface, and wherein the implementation of the second treatment parameters comprises at least one operation between: lifting and lowering the blade with respect to the road surface, rotating the blade around at least one adjustment axis, varying the telescopic extension of the blade.

5. The method according to claim 1, wherein the industrial vehicle further comprises a GNSS or GPS navigation system, wherein the step of calculating the estimated time for reaching said physical feature is automatically carried out by said GNSS or GPS navigation system.

6. The method according to claim 1, wherein the step of detecting the physical feature comprises applying an environmental model to data acquired through a LiDAR or a RADAR mounted on the industrial vehicle.

7. The method according to claim 6, wherein the environmental model is a computer program configured to determine, on the basis of data provided by the LiDAR or RADAR: the width of said road route at said physical feature; the first distance; the second distance.

8. The method according to claim 7, wherein the industrial vehicle comprises delivery means configured to spread a solid and/or liquid product on the road surface, wherein the implementation of the second treatment parameters comprises adjusting spreading parameters of said product between: type of product spread, amount of product spread per area unit, the width of spreading, symmetry of spreading, wherein the step of calculating the second treatment parameters comprises adjusting the width of spreading in such a way that the width of spreading has a value less than said width of the road route at said physical feature.

9. The method according to claim 7, wherein the industrial vehicle comprises delivery means configured to spread a solid and/or liquid product on the road surface, wherein the implementation of the second treatment parameters comprises adjusting spreading parameters of said product between: type of product spread, amount of product spread per area unit, the width of spreading, symmetry of spreading, wherein the step of calculating the second treatment parameters comprises adjusting the symmetry of spreading as a function of said first and second distances, so that the range of said product by the delivery means is, at the first edge, equal to or less than the first distance and, at the second edge, equal to or less than the second distance.

10. The method according to claim 7, wherein the industrial vehicle is provided with a blade of telescopic type for the mechanical removal of snow and/or ice from the road surface, wherein the implementation of the second treatment parameters comprises at least one operation between: lifting and lowering the blade with respect to the road surface, rotating the blade around at least one adjustment axis, varying the telescopic extension of the blade, wherein the step of calculating the second treatment parameters comprises varying the telescopic extension of the blade so that the blade has an extension value less than said width of the road route at said physical feature.

11. A system for controlling an industrial vehicle during a road surface treatment operation of a road route carried out by the industrial vehicle using first treatment parameters, comprising:

an environmental model module configured to detect at least one of: i) a physical feature in said road route, ii) an actual variation of the travel direction of the industrial vehicle in said road route, and iii) a planned variation of the travel direction of the industrial vehicle in said road route, wherein said physical feature determines a local narrowing or widening of said road route, and said actual variation and planned variation determine a corresponding variation of a first distance of the industrial vehicle from a first edge of the road route and of a second distance of the industrial vehicle from a second edge of the road route;

at least one parameter calculation module configured to calculate, as a function of said first and second distances and/or as a function of said local narrowing or widening, second treatment parameters of the road surface; and a parameter implementation module configured to:

in case of actual variation of said travel direction, control the immediate implementation of the second treatment parameters by the industrial vehicle;

otherwise carry out the operations of:

calculating an estimated time for reaching said variation of the travel direction or physical feature, calculating a time interval value required for a complete implementation of the second treatment parameters, and starting the implementation, by the industrial vehicle, of the second treatment parameters at a time that is equal to the estimated time excluding the time interval of complete implementation.

12. The system according to claim 11, wherein said physical feature is one between: a geometric variation of the road route; a presence of an object or obstacle in said road route; a presence of transport means in said road route.

13. The system according to claim 11, wherein the industrial vehicle comprises delivery means configured to spread a solid and/or liquid product on the road surface, and wherein the parameter implementation module is further configured to implement the second treatment parameters by adjusting spreading parameters of said product between: type of product spread, amount of product spread per area unit, width of spreading, symmetry of spreading.

14. The system according to claim 11, wherein the industrial vehicle is provided with a blade of a telescopic type for the mechanical removal of snow and/or ice from the road surface, and wherein the parameter implementation module is further configured to implement the second treatment parameters carrying out at least one operation between: lifting and lowering the blade with respect to the road surface, rotating the blade around at least one adjustment axis, varying the telescopic extension of the blade.

15. The system according to claim 11, further comprising a GNSS or GPS navigation system, the parameter implementation module being configured to calculate the estimated time for reaching said physical feature using geolocation data provided by said GNSS or GPS navigation system.

16. The system according to claim 11, further comprising a LiDAR or RADAR sensor, said environmental model module being configured to cooperate with said LiDAR or RADAR sensor in order to identify said physical feature, first distance, second distance.

17. The system according to claim 16, wherein the environmental model is a computer program, the system further comprising a processing unit configured to run said environmental model to determine, on the basis of data provided by the LiDAR or RADAR: the width of said road route at said physical feature; the first distance; the second distance.

18. The system according to claim 17, wherein the industrial vehicle comprises delivery means configured to spread a solid and/or liquid product on the road surface,
and wherein the parameter implementation module is further configured to implement the second treatment parameters by adjusting spreading parameters of said product between: type of product spread, amount of product spread per area unit, width of spreading, symmetry of spreading,
further comprising a movement module coupled to the parameter implementation module and configured to: receive, from the parameter implementation module, the second treatment parameters, and adjust the width of spreading so that the width of spreading has a value less than said width of said road route at said physical feature.

19. The system according to claim 17, wherein the industrial vehicle comprises delivery means configured to spread a solid and/or liquid product on the road surface, and wherein the parameter implementation module is further configured to implement the second treatment parameters by adjusting spreading parameters of said product between: type of product spread, amount of product spread per area unit, width of spreading, symmetry of spreading,
further comprising a spreading module coupled to the parameter implementation module and configured to control the delivery means for adjusting the symmetry of spreading as a function of said first and second distances, such that the range of said product is, at the first edge, equal to or less than the first distance and, at the second edge, equal to or less than a second distance.

20. The system according to claim 17, wherein the industrial vehicle is provided with a blade of a telescopic type for the mechanical removal of snow and/or ice from the road surface,
and wherein the parameter implementation module is further configured to implement the second treatment parameters carrying out at least one operation among: lifting and lowering the blade with respect to the road surface, rotating the blade around at least one adjustment axis, and varying the telescopic extension of the blade,
further comprising a movement module coupled to the parameter implementation module and configured to: receive, from the parameter implementation module, the second treatment parameters, and vary the telescopic extension of the blade so that the blade has an extension value less than said width of said road route at said physical feature.

* * * * *